Inventor
Karl L. Herrmann,

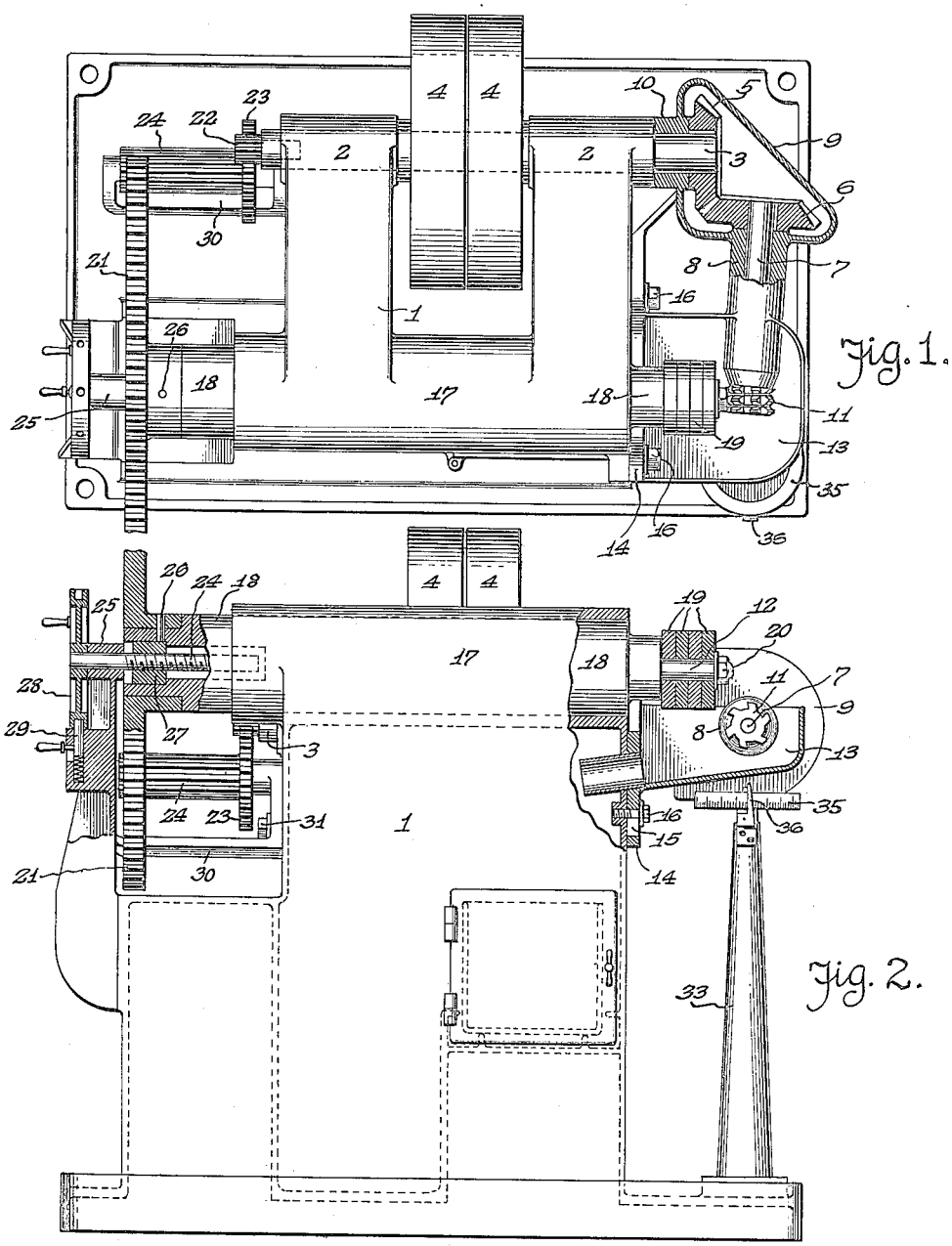

Patented Feb. 6, 1923.

1,444,247

UNITED STATES PATENT OFFICE.

KARL L. HERRMANN, OF DETROIT, MICHIGAN, ASSIGNOR TO STUDEBAKER CORPORATION, A CORPORATION OF NEW JERSEY.

HOBBING MACHINE.

Application filed April 17, 1922. Serial No. 554,060. REISSUED

*To all whom it may concern:*

Be it known that I, KARL L. HERRMANN, a citizen of the United States of America, residing at Detroit, in the county of Wayne and State of Michigan, have invented certain new and useful Improvements in Hobbing Machines, of which the following is a specification, reference being had therein to the accompanying drawings.

This invention relates to gear cutting machines and more particularly to that class of such machines known as hobbing machines. An object of the invention is to simplify the construction whereby a minimum number of gears is employed to secure the proper relative movement between the hob and work and to provide certain other new and useful features in the construction, arrangement and combination of parts.

With the above and other ends in view the invention consists in the matters hereinafter set forth and more particularly pointed out in the appended claims, reference being had to the accompanying drawings, in which—

Figure 3:
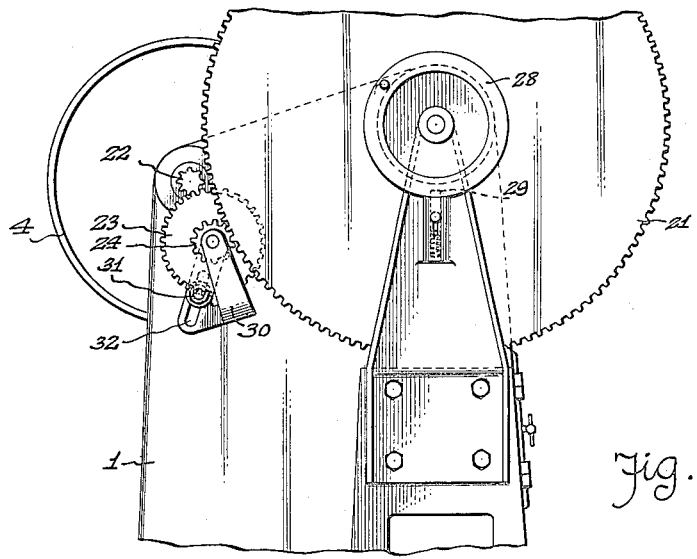

Figure 1 is a plan view of the machine illustrative of an embodiment of the invention and with portions broken away and in section to more clearly show the construction;

Fig. 2, a side elevation of the same with portions broken away and in section;

Fig. 3 a partial end elevation of one end of the machine, and

Figure 4:
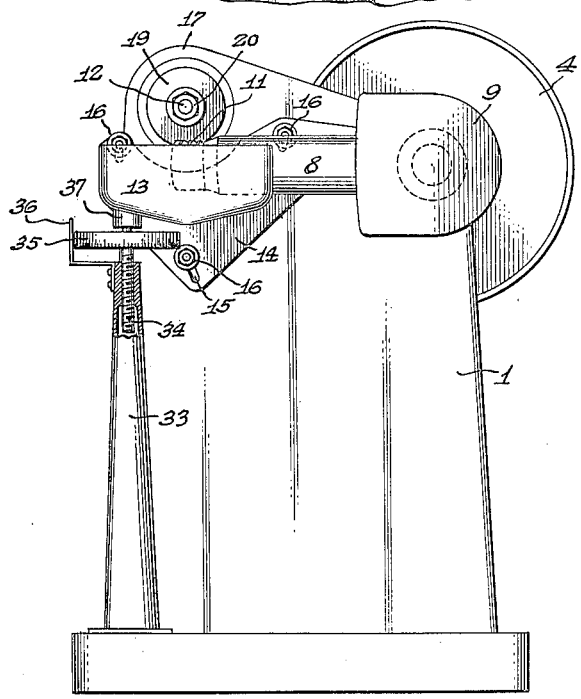

Fig. 4 an elevation of the opposite end.

In the cutting of gears or worm wheels by means of a cutter known as a hob, it is necessary to rotate the work or blank in timed relation to the rotation of the hob and to move the blank and hob relatively and in timed relation to the other movements. These relative timed movements have been secured through the employment of a complicated gearing for transmitting the proper motion but because of such complication, and the large number of gears employed there is a liability of inaccuracy in the work and the machine is expensive to manufacture and to keep in running condition. It is an object of the present invention to provide a construction in which a minimum number of gears is employed, thus simplifying the construction and eliminating many of the difficulties and disadvantages of the more involved construction.

As illustrative of an embodiment of the invention a machine is shown in the accompanying drawings comprising a suitable supporting frame 1 provided with bearings 2 for a main drive shaft 3 which is provided intermediate these bearings with belt pulleys 4. Secured upon one end of the shaft 3 is a beveled gear 5 in mesh with a like beveled gear 6 secured upon a shaft 7 mounted in a bearing 8 formed integral with a gear casing 9 which gear casing is provided with a bearing 10 to receive the shaft 3 and swing about the axis of said shaft. The shaft 7 forms the spindle upon which the rotary tool or hob 11 is secured and to hold the casing 9 carrying said spindle, in proper adjusted position relative to a work spindle 12, and also to form a pan or receptacle beneath the hob or cutter, a pan 13 is secured integral with the bearing portion 8 of the casing 9 and this pan has ears 14 thereon provided with slots 15 to receive bolts 16 engaging screwthreaded openings in the frame 1 for adjustably holding the casing 9 of which the pan 13 forms a part, the side of said pan being securely held against the side of the frame by means of said bolts. By loosening these bolts and swinging the casing together with the spindle 7 carried thereby about the axis of the main driving shaft 3, the hob or cutter 11 may be adjusted toward or from the work.

A long bearing 17 is provided on the frame 1 for the enlarged portion 18 of the work carrying spindle 12, the work consisting of a series of blanks 19 being secured upon the reduced end portion of this spindle in any suitable manner as by a nut 20. Mounted upon the opposite end of the spindle 18 is a large spur gear 21 by means of which the work spindle is rotated at a very low speed, motion being transferred from the main drive shaft 3 through a small pinion 22 on the end of the drive shaft which pinion is adapted to mesh with a spur gear 23 which is secured to or formed integral with an elongated gear or pinion 24 in mesh with the large pinion 21. The speed of rotation of the main drive shaft is therefore through the several gears greatly reduced so that a very slow rotation will be imparted to the work spindle in timed relation to the rotation of the hob and the hob spindle is mounted at the proper angle relative to the longitudinal axis of the work spindle to cause the hob to form spur gear teeth upon the peripheries of the blanks when the work spindle is rotated in proper timed relation to the rotation of the hob and also moved longitudinally to present the blanks to the hob, the horizontal plane of the work spindle being above the plane of the axis of the hob so that upon longitudinal movement of the work spindle the work will be moved across the hob, the hob being held in the position to which it is adjusted relative to the work spindle, by adjusting the casing 9 rotatively about the axis of the driving shaft 3. The feeding of the work to the hob is accomplished by providing a screw shaft 24 which shaft is mounted in a suitable bearing 25 on the frame and held by said bearing against longitudinal movement but free to turn therein, said screw shaft extending into a bore in the end of the spindle 18. Within the bore of the spindle is secured in any suitable manner as by a pin 26, a nut 27 having an internal screw thread to receive the screwthreaded shaft 24. Upon the transmission of motion to the large gear 21, the work spindle will be slowly rotated and as the screw shaft 24 is held against rotation by means of a hand wheel 28 on its outer end having a lock bolt 29 for locking the wheel against turning, the turning of the spindle which carries the nut 27 will feed the spindle forwardly and bring the work carried by its opposite end into engagement with the hob. This feeding movement of the work spindle is therefore in timed relation to the rotation of the spindle and the rotation of the hob and by properly proportioning the different speeds of rotation and the pitch of the screw 24, the desired form of teeth will be cut by the hob in the peripheries of the blanks as these blanks are fed horizontally and with a simultaneous movement across the hob. When the spindle has reached the end of its longitudinal movement and the blanks have been carried across the hob and the cutting operation completed, the spindle may be quickly returned to the position shown in the drawings, by releasing the latch bolt 29 and rotating the screw shaft 24 by means of a hand wheel 28. The finished work is then removed from the spindle and other blanks secured in place thereon and the operation repeated.

As the work spindle is moved longitudinally, it carries the large gear wheel 21 with it, said gear wheel sliding in mesh with the long gear 24 during the reciprocation of the spindle. The gears 23 and 24 are idler gears for transmitting motion from the pinion 22 to the large gear 21 and these gears 23 and 24 are carried by a suitable bracket 30 which is adjustably secured to the frame 1 by means of a locking bolt 31 passing through a slot 32 in the bracket. The meshing engagement of these idlers with their gears may therefore be adjusted or may be removed and others substituted having a different number of teeth for the purpose of changing the ratio of rotation between the work spindle and the hob or spindle. The depth of tooth to be formed on the blanks may be varied by adjusting the hob toward or from the blanks, said adjustment being accomplished by swinging the casing 9 which carries the hob spindle, about the axis of the driving shaft 3 as previously described, and to assist in this adjustment which must of necessity be very minute and accurate, a pedestal 33 is provided beneath the pan 13 and in the upper end of this pedestal is mounted a screw shaft 34 carrying an index wheel 35 upon its upper end with a pointer 36 secured to the pedestal and extending across the face of the wheel, the upper end of the shaft abutting against a lug 37 on the lower side of the pan so that by turning the screw shaft by means of the index wheel, the casing or frame of which the pan forms a part and which carries the hob spindle, may be accurately raised or lowered and such adjustment will be indicated by the wheel. After the proper adjustment of the hob relative to the work is thus secured, it is held in adjusted position by tightening the bolts 16. By mounting the hob spindle for rotation in fixed relation to the work, and arranging the work carrying spindle for movement across the hob, the necessary relative and timed rotative and feeding movements may be secured through the employment of a minimum number of gears and a very simple and efficient construction.

Obviously any desired relative speeds of work spindle and hob may be secured to suit the particular work in hand and it is also obvious that other changes may be made within the scope of the appended claims, in the particular combination and arrangement of parts, without departing from the spirit of the invention and I do not therefore limit myself to the particular construction shown.

What I claim is:—

1. In a hobbing machine, the combination of a main drive shaft and a hob spindle in radial relation thereto, means for holding said spindle in a fixed position, a work carrying spindle longitudinally movable angularly across the axis of the hob spindle, and means for imparting a rotary motion to said spindles in timed relation to each other and a longitudinal movement to the work spindle in timed relation to the relative movements of said spindles.

2. In a hobbing machine, the combination of a hob spindle, means for holding said spindle in a fixed position, a work carrying spindle longitudinally movable angularly across the axis of the hob spindle, means for imparting a rotary motion to said spindles, and means directly operated by the rotation of said work spindle for moving said spindle longitudinally.

3. In a hobbing machine, the combination of a hob spindle, means for holding said spindle in a fixed position, a work carrying spindle longitudinally movable angularly across the axis of the hob spindle, means for imparting rotary motion to said spindles in timed relation to each other, and means carried by the work spindle including a member operated by the rotation thereof for moving said spindle longitudinally.

4. In a hobbing machine, the combination of a hob spindle, means for holding said spindle in a fixed position, a work carrying spindle longitudinally movable angularly across the axis of the hob spindle, a main driving shaft, means for transmitting motion from said shaft to said spindles to rotate the same in timed relation to each other, and means including a screw and nut operated by rotation of said work spindle for moving said spindle longitudinally.

5. In a hobbing machine, the combination of a hob spindle, a drive shaft, a member extending radially from and supported to swing about the axis of said shaft and forming an adjustable support for said hob spindle, means for holding said member in the position to which it is swung about said shaft, a longitudinally movable work spindle arranged at an angle to the axis of the hob spindle to project the work carried thereby across a hob carried by the hob spindle, gearing for transmitting motion from the drive shaft to the hob spindle, and means operated by the rotation of the work spindle for moving said spindle longitudinally in timed relation to the rotative movements of said spindles.

6. In a hobbing machine the combination of a work spindle, a main drive spindle parallel thereto and a pivotally supported hob spindle whose pivotal line crosses its axis, and having a hob receiving portion adjustable toward said work spindle, means for producing timed rotation and cross movement between, and for adjusting and holding the relative positions of, said work spindle and said hob spindle.

7. In a hobbing machine, a work spindle and a hob spindle having a hob receiving portion, said hob spindle pivoted about a line crossing its axis, and means for varying the distance between said work spindle and said hob receiving portion along an arcuate path.

8. In a gear cutting machine, the combination of a work spindle, and a cutter spindle having a cutter thereon; said cutter spindle pivoted about a line crossing its axis; said cutter and said work spindle being adjustable toward each other along a circumferential path; means for producing timed rotation and cross movement between, and for holding the relative position of, said elements.

9. In a hobbing machine, a hob pivoted about a line crossing its axis, and a work spindle, the distance between the work spindle and hob spindle being adjustable along an arcuate path.

10. A gear cutting machine having cutter receiving means pivoted about a line crossing its axis, and work receiving means, the distance between said means being variable in a circumferential path.

11. A gear cutting machine having a cutter spindle pivoted about a line crossing its axis, and a work spindle, one of said elements being adjustable towards the other along a circular path.

12. In a hobbing machine, a work spindle, and hob spindle having a hob receiving portion thereon, the distance between said work spindle and said hob receiving portion being variable in an arcuate path about a center line which crosses the axis of the hob spindle.

In testimony whereof I affix my signature in presence of two witnesses.

KARL L. HERRMANN.

Witnesses:
ANNA M. DORR,
LEWIS E. FLANDERS.